United States Patent [19]

Penn

[11] Patent Number: 5,593,531
[45] Date of Patent: Jan. 14, 1997

[54] SYSTEM, METHOD AND PROCESS FOR FABRICATION OF 3-DIMENSIONAL OBJECTS BY A STATIC ELECTROSTATIC IMAGING AND LAMINATION DEVICE

[75] Inventor: Steven M. Penn, Plano, Tex.

[73] Assignee: Texas Instruments Incorporated, Dallas, Tex.

[21] Appl. No.: 336,634

[22] Filed: Nov. 9, 1994

[51] Int. Cl.⁶ ............................................. B32B 31/00
[52] U.S. Cl. ................................. 156/272.6; 156/379.8; 264/308; 425/174.8 E
[58] Field of Search ....................... 156/272.2, 272.6, 156/272.8, 273.3, 275.1, 275.5, 290, 307.1, 379.6, 379.8; 425/174.4, 174.8 R, 174.8 E; 264/308, 401

[56] References Cited

U.S. PATENT DOCUMENTS

| | | | |
|---|---|---|---|
| 4,752,352 | 6/1988 | Feygin | 156/630 |
| 5,015,312 | 5/1991 | Kinzie | 156/63 |
| 5,174,843 | 12/1992 | Natter | 156/155 |
| 5,289,214 | 2/1994 | Zur | 346/153.1 |
| 5,306,446 | 4/1994 | Howe | 264/401 |
| 5,352,310 | 10/1994 | Natter | 156/155 |
| 5,354,414 | 10/1994 | Feygin | 156/630 |

*Primary Examiner*—James Sells
*Attorney, Agent, or Firm*—W. Daniel Swayze, Jr.; W. James Brady, III; Richard L. Donaldson

[57] ABSTRACT

A prototype is fabricated from layers of a part and support. A first charging apparatus forms a first charged area to attract a first dry material, and a second charging apparatus from a second charged area to attract a second dry material. The first and second dry material is transferred to form a layer of part and support.

26 Claims, 4 Drawing Sheets

SYSTEM, METHOD AND PROCESS FOR FABRICATION OF 3-DIMENSIONAL OBJECTS BY A STATIC ELECTROSTATIC IMAGING AND LAMINATION DEVICE

TECHNICAL FIELD OF THE INVENTION

This invention relates to rapid prototyping and more particularly to a system, method and process for the manufacture of 3-dimensional objects from computer data using a photo-imaging station.

BACKGROUND OF THE INVENTION

As complex designs increase, the need for rapid prototype fabrication has increased. The need for immediate fabrication of these objects require model or machine shops to fabricate complex parts quickly and to fabricate a low volume of these objects with minimum setup and run time. Most fabrication methods, however are slow, complex and expensive.

While manual machining and forming methods for these methods are often cheap and effective for simple designs, the cost can be prohibited for numerous iterations required of complex parts and assemblies. Computer numerically control (CNC) machines are widely used to automate complex fabrication, but these CNC machines are costly to operate, maintain and program just for as one of a kind production.

One lithographic fabrication method is selective laser sintering. This method employs a heat laser to fuse (sinter) selected areas of powdered material such as wax, plastic or metal. In practice, a vat of powder is scanned by the laser, melting individual particles which then stick to adjacent particles. Layers of the fused powder are processed sequentially like photopolymer lithography. An advantage of the sintering method is that a non-heated powder serves as a support for the part as it is formed. This means that the non-heated powder can be shaken or dusted off the object.

Selective laser sintering however is also a complex, expensive optical system. The resolution of the final part is limited by the beam diameter which is typically 0.01 inches to −0.02 inches. Furthermore, an additional step may be required, in that the powder is deposited and leveled by a rolling brush which requires other electromechanical components. Unfortunately, leveling fine powders with a rolling brush often causes non-homogeneous packing densities. Additionally, white powder costs less (material and labor) than liquid photopolymer, and preparing a 30 micron layer is difficult. An object built from this powder is of minimum resolution and has a non-uniform surface and often a non-homogeneous structure.

The casting industry has long used heat-disposable patterns in the making of metal objects. The process of investment casting is historically known as the "lost wax" process. This process is performed by supplying a wax pattern of the item to be cast. A geometric cavity results after the pattern is encapsulated in ceramic and is then removed by melting of the wax of the pattern. The cavity is filled with metal or other casting material which then takes the exact shape of the original pattern. Other pattern materials have been tried such as wood, foam and plastic, but these types of pattern materials are more difficult to be removed by heating. A requirement of any casting method is that the ceramic encapsulate or mold remains intact without cracking during the pattern melt or burnout.

Research has been conducted at the Massachusetts Institute of Technology in fabrication by 3-dimensional printing. In this research, ceramic powder is deposited using a wide feeder over a vat or tray. A silica binder is printed on select areas of the powder to form a solid cross-section. The process is repeated to form a stack of cross-sections representing the final objects.

This approach exhibits the same powder deposition problems as selective laser sintering along with the additional difficulty in removing unbound powder form internal cavities. Furthermore, objects generated by this system are not recyclable. The MIT research is directed toward production of ceramic molds. Metal or other materials are then injected or poured into the mold which is later broken away from the cast part. Unfortunately, the mold's internal cavities which define the final parts are not easily inspected, which leads to an expensive trial and error process to acquire accurate parts.

Rapid Prototyping or Solid Imaging systems have been introduced which form parts and models of plastic, paper, or ceramic, while under process and spatial control by computer. These models are intended to be accurate reproductions of computer data or electronic images. Such images are collected from a variety of input devices including CAD, CT scans, MRI, PET, Satellite Ranging and Imaging, Ultrasound, and Scanning Electron Microscopy.

Solid Imaging mechanisms are determined by the material candidates and lamination techniques. Most common approaches employ a laser beam to polymerize, cut-out, or otherwise sinter a vertical sequence of thin, horizontal cross-sections defining a 3-Dimensional object. These systems are costly, environmentally harmful, and often inaccurate due to thermally induced warpage. Most systems are not compatible with a typical office work area, due to resins, solvents, fumes and high power lasers.

More practical systems are based on jet or syringe type dispensers, which jet melted waxes, plastics, or alloys in sequential cross-sections which solidify on contact with the previous layer. While these systems are lower in cost and complexity than laser based systems, they suffer from lamination problems and inaccuracy, again, due to thermal stress and the difficulty in controlling the layer-to-layer bond mechanism.

Hot wax inkjets and nozzles are difficult to position quickly and precisely, especially while connected to fluid containers and electro-mechanical devices. The maintenance of temperature control, alignment and media filtration are critical to functionality for such dispensers. Bulk fluid transport is dependent on precise maintenance of fluid level, temperature, and pressure throughout the feed path, so it is desirable to keep the raw material in solid form until jetting or liquid dispensing which may be difficult.

As each layer is constructed, solid imaging systems typically generate a temporary support structure, casing, or scaffolding, which is removed after the vertical layering build is completed. Supports are generally removed manually, but automation is possible through the use of a soluble support surrounding an insoluble model.

While the soluble support is desirable, accurate placement of the two fluid materials within a layer is difficult to accomplish without overlapping of the two fluid materials. In practice, surface leveling devices are used in most systems to control the height and flatness of each layer formed. This causes excess material displacement or removal, which in turn requires a reclamation mechanism.

A laser printer includes a rotating mirror to reflect a pulsed laser beam. The laser beam is swept across a photosensitive drum to selectively charge individual pixels. These produce alternating charged and uncharged areas. The charged areas attract toner which has been positioned close by to "write black" while the uncharged area do not attract toner to "write white". The charged areas now are toner areas while the uncharged area remains free of toner. A sheet of paper may be positioned against the drum the toner areas transfer from the drum to the paper. The paper including the toner is then heated to fire the toner on the paper.

The fundamental problem is the inability to laminate thin layers composed of solid materials of opposite solubility, with common applicators, while maintaining dimensional accuracy of the laminate. The resulting 3-Dimensional laminate is required for casting patterns, color visual models, and integrated conductive pathways.

SUMMARY OF THE INVENTION

3-Dimensional computer data is sliced or sectioned horizontally to generate cross-sectional images. These sliced data include data corresponding to areas of no part or support part and support. The sliced data is transferred electronically to a process station where the 3-dimension object is fabricated on a platform adjusted in elevation as lamination proceeds.

Electrostatic printer or photocopier mechanisms are used to image and construct thin layers of toner or fine powder media from the sliced data. The new layer of powder, defined by computer cross-sectional or sliced data, is transferred to the photo-exposed surface of a layer previously constructed in the same manner, then fused by heat application and cooled. The cycle of imaging and laminating is continued until the 3-Dimensional model is complete. Soluble wax such as Polyethylene Glycol powder may be used for the support area in this process. For applications such as 3-Dimensional terrain models, the lack of overhangs eliminates the need for support other than the initial platform.

Alternately, a layer of adjacent areas of soluble and insoluble powder is transferred and affixed to a polymer sheet, for example of the type used for transparencies. The sheet maybe a continuous loop so that it conveys the affixed soluble/insoluble layer from the photo-imaging station to the laminating station where thermal plate or roller bonds the new layer to prior layers. The advantage of this technique is dimensional inspection and control over the layer thickness and flatness. A uniform thick layer which is essentially flat is formed. The transfer sheet also protects the layer to be transferred from contact with process components until lamination with the structure being built occurs and the transfer sheet separates from the layer of soluble and insoluble area.

Additionally, a computer controller a x-y movement device to move at least two toner dispensing apparatus to dispense either soluble or non-soluble toner and at least two imaging apparatus to charge an area to receive the output of the dispensing apparatus. These apparatuses are further controlled by the computer to produce the layer of part and support. The soluble and non-soluble toner are hardened to form a soluble structure which should not collapse.

When all layers are imaged and vertically laminated, the resulting part exists within a soluble case or shell. The entire structure is washed with water, removing the soluble shell and leaving the desired part intact.

Dry media, rather than fluid, is disposed in a precise area and thickness defined by computer sectional or sliced data.

Thermal lamination and cooling then occurs to simultaneously affix both soluble and insoluble areas to previously constructed sections. Other systems or apparatus dispense liquid to solidify in the defined pattern or else use lasers to solidify patterns within layers of excess powder or liquid.

Low cost, speed, and dimensional accuracy are enhanced by the precise and proven electrostatic imaging mechanisms, in use in the printer/copier industry for many years. Photo-imaging devices such as lasers, LED, LCD, Digital Micro-mirrors, and other image projectors are useable with this device.

During layer-on-layer construction of the structure, a common mechanism can be applied to soluble, insoluble, metallic, and pigmented powder media, enabling structures of complex geometry and composition. Other systems must incorporate and control different dispensing and fusing mechanisms for materials of differing properties, making simultaneous imaging and laminating of more than one material impractical.

The present invention includes an apparatus for fabricating a prototype including a part and support, including a belt to transport a layer of the part and support, a first charging apparatus to charge a first charged area on the belt, a first application apparatus to apply a first material to the belt so that the first material is attracted to the first charged area, a second charging apparatus to charge a second area on the belt, a second application apparatus to apply a second material to the belt so that the second material is attracted to the second area, a transfer apparatus to transfer the first and second material from the belt to the prototype in order for the part and support.

The present invention includes a flexible belt. The present invention further includes a continuous belt. The present invention includes a first dry material as the first material and a second dry material as the second material. Further, the present invention includes a single controller to control the first and second charging apparatus. Furthermore, the present invention includes the transfer apparatus to transfer said first and second material from said belt by applying heat sufficient so that the first and the second materials are tacky.

The present invention includes an apparatus for fabricating a prototype including a part and support, including a belt to transport a sheet to convey a layer of the part and support, a first charging apparatus to charge a first charged area positioned on the sheet, a first application apparatus to apply a first material to the sheet so that the first material is attracted to the first charged area, a second charging apparatus to charge a second area positioned on the sheet, a second application apparatus to apply a second material to the sheet so that said second material is attracted to the second area, a transfer apparatus to transfer the first and second material from the belt to the prototype in order to form the part and support.

These and other features of the invention that will be apparent to those skilled in the art from the following detailed description of the invention, taken together with the accompanying drawings.

DETAILED DESCRIPTION OF THE INVENTION

This invention's use of high speed photo-imaging devices and techniques laminator combined with precise vertical positioning, enables low cost, simplicity, and a wide range of available materials to form a structure of both part and support to support the part. The elimination of jetting or liquid dispensing devices enables reliable layer formation. Powder materials and dispensers are advantageous over liquid dispensers, eliminating the clogging misfiring of the dispensers and inaccurate placement of the media.

Experience in the field has shown that this invention will be very safe in use in an environment with people and deployable in volume, since the imaging and dispensing mechanisms described herein are historically compatible with ordinary work areas. The mechanisms including materials and process of this invention minimizes the risk to explosion, toxicity, and other occupational and environmental concerns.

The invention is advantageous in the accuracy of the desired model. The use of plates or rollers is used to laminate the new layer to previously formed layers and also serves to constrain the new layer from moving with respect to the previously formed layer during lamination, eliminating warpage typical of solid imaging systems. The use of a heater between the layers to be bonded promotes adhesion and coupled contraction during cooling.

This invention also provides measurement of the new layer and feedback to compensate for any discrepancy or process error by adding corrective material to the layer in the subsequent formation of layer.

This invention provides for variable color, strength, or conductivity in within the laminate by the control of soluble or insoluble material is also advantageous for visual communication, function, or electrical applications. The present invention is not restricted to the use of one material or the characteristics of the material used. The present invention by changing the soluble and insoluble material proves an unlimited range of viscosity, surface tension, and melting points.

The advantage of efficient consumption of material is inherent in this invention. This invention places the consumable powder only in areas defining part or support with the support area conforming to the perimeter of the part. In this manner, less material overhead is required, in terms of cost, bulk supply, and handling.

Figure 5:
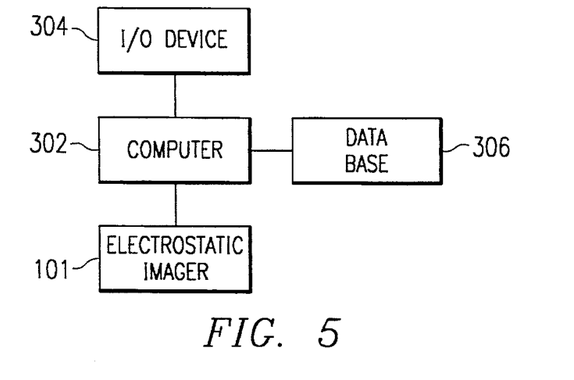
FIG. 5 is a circuit diagram of a control system to control the embodiment of the present invention.

Referring to FIG. 5, a computer 302 is coupled to a IO database, for example a keyboard and display in order to input commands to control the electrostatic imager 101 and to output status and data information from the electrostatic imager 101. Although electrostatic images are shown connected to computer 302, any of the embodiment, namely electrostatic imager 201 or electrostatic imager 200. Furthermore, coupled to the computer 302 is a database 306 to include a model of the part and support to be built layer by layer. The computer 302 reads the database 306 for the sectional or sliced data of the part and support and controls the electrostatic imager 101 by transmitting the sectional or sliced data to the electrostatic imager 101.

Figure 10:
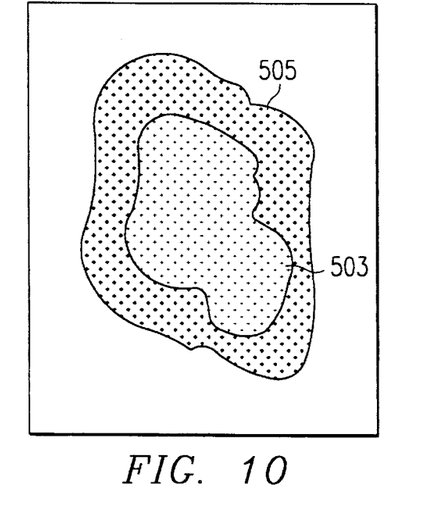
FIG. 10 is a diagram of the sectioned data or sliced data.

FIG. 10 illustrates the sectional or sliced data stored in database 306. Each of the three areas namely part area 503, where a part is to be formed from an insoluble material, a support area 505 where support for the part is to be formed of soluble material and open area 507 where no part (insoluble) material or support (soluble) material is to be located, but other data may have sectional or slice data may have either part area 503 or support area 505. The port area 503, support area 505 may be represented by an x and y location and an identifying symbol to represent either the part area or the support area.

Figure 1:
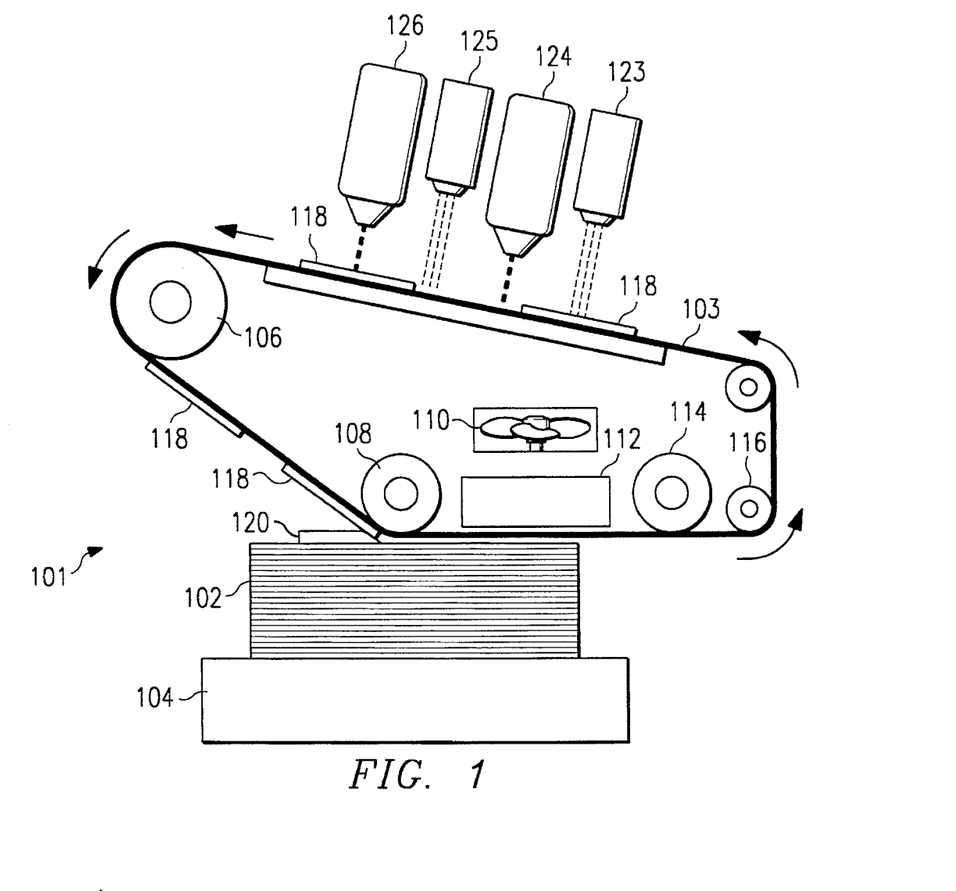
FIG. 1 is a cross section of an apparatus of the present invention.
Figure 2:
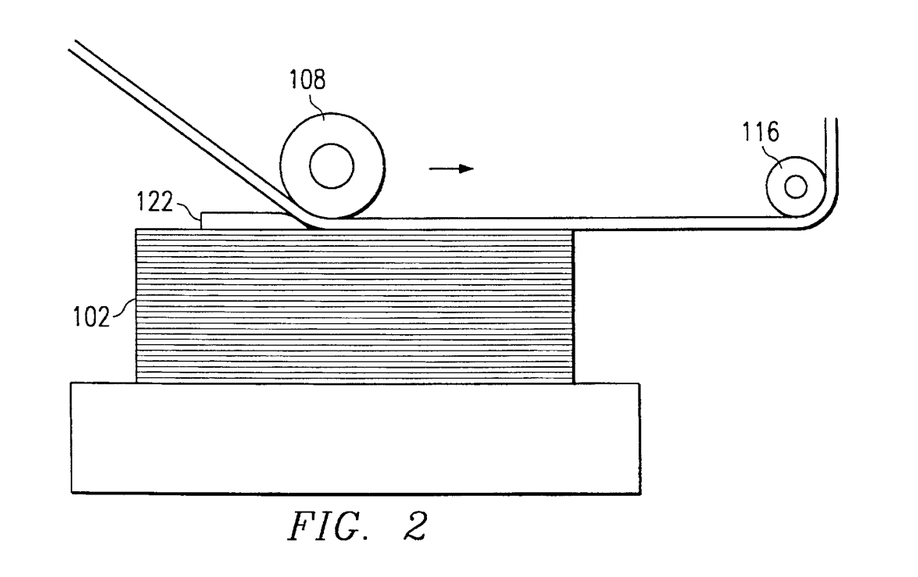
FIG. 2 is a detailed cross-section of a portion of the present invention.

FIG. 1 illustrates one embodiment of the electrostatic imager 101. The electrostatic imager 101 converts the sectional data to the part to be built and support 102. The layers of part and support formed corresponding to the sectional data including part area 503 and support area 505 are supported by a base 104. The base 104 may be a part platform which can be moveable in the Z direction in order to lower and raise the part and support 102. The part and support 102 is formed from layers which have been deposited on the transfer material 118. A support belt 103 is supported and driven by roller 106. Additionally, support apparatus 116, for example a guide supports the support belt 103. On the surface of the support belt 103 a transfer material 118, for example transparency or malrar is positioned to receive charge and at least two kinds of toner material in order to form a layer of the part and support 102. Although the invention has been described with two materials, one soluble, another insoluble, additional materials could be employed with additional charging and dispensing devices to achieve a multi material part and support to vary the characteristics of the part and support. Roller 108 guides the support belt 103. Cooling apparatus 110 cools the support belt 103 after the transfer of the at least two materials to the part and support 102. A cooling apparatus 112 further cools the support belt 103. Furthermore, a cooling apparatus 114 cools and supports belt 103. The combined effect of cooling an apparatus 110, cooling apparatus 112 and cooling apparatus 114 provides a staggered arrangement to remove heat from the support belt 103. At least two different kinds of materials are deposited on the transfer material 118 in order to form the layer of part and support 102. The transfer apparatus 120 transfers the layer from the transfer material 118 to the part and support 102. Guides 122 as illustrated in FIG. 2 guides the support belt 103. Furthermore, the guide 122 is heated so that the layer on transfer material 118 is heated to a "sticky state" such that the layer is easily transferable and transferred to part and support 102. The layer is formed by repeatedly placing a charge on a predetermined area of the transfer material 118 and dispensing a dry material that is attracted and positioned only on the charged predetermined area. The dry material may be toner used in copying machines. The first charge application apparatus 123 forms a first charge area on transfer material 115. A first toner application apparatus 124 applies a first material, for example toner that is attracted to the first charged area. The second charge application apparatus 125 forms a second charge area and the transfer matter. A second toner application apparatus 126 applies a second material that is attracted to the second charged area.

As the transfer material 118 is passing under first charged application apparatus 123, the first charged area is formed on transfer material 118. First toner application apparatus 124 dispenses the first dry material, for example toner to the transfer material 118 where the first charge application apparatus 125 has formed the first charged area. The first dry material is attracted to the first charged area and is positioned to be transferred. Next, a second charge application apparatus 125 forms a second charged area on transfer material 118. Then a second toner application apparatus 126 places the second dry material onto the transfer material 118 in accordance with the charge placed by the second charge application apparatus 125. The first dry material and the second dry material forms the layer of the part and support 102. The transfer material 118 is moved along the support belt 103 around roller 106 and as it passes over guide 122, the guide 122 heats first and second dry material to a tacky state, and as the transfer material 118 is transferred over the part and support, the first and second dry material is transferred to form a new layer of part and support 102.

Figure 3:
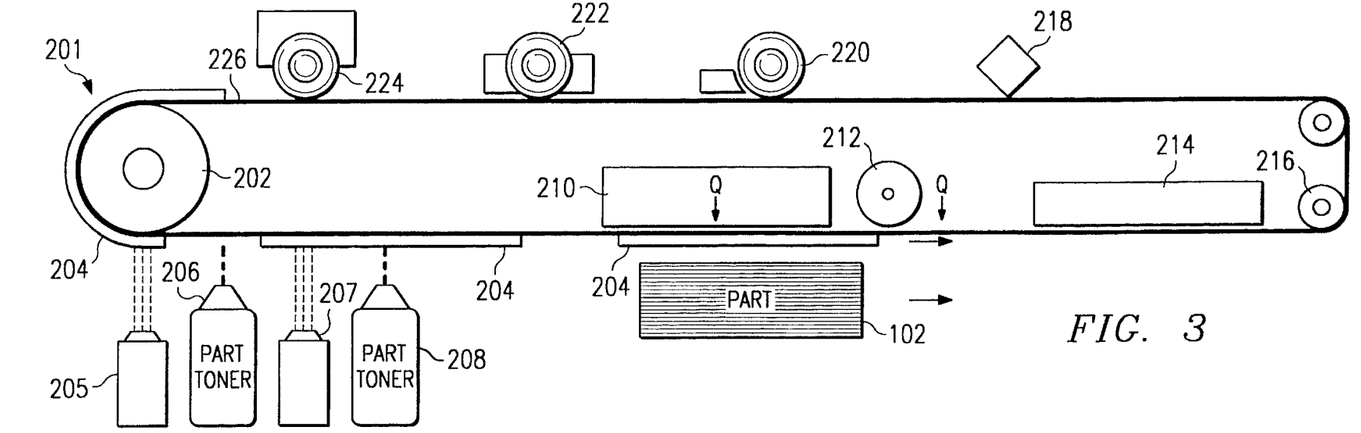
FIG. 3 is a cross section of an additional embodiment of the present invention.

FIG. 3 illustrates another embodiment of the present invention. FIG. 3 illustrates that at least two materials of a layer 204 are formed directly on a flexible belt 226. These at least two materials of layer 204 are formed first by first charge application apparatus 205 to place a first charged area in accordance with the data stored in database 306. The first toner application apparatus 206 places first dry material, for example toner such that the first dry material is attracted and forms where the first charged area has been formed. The second charge application apparatus 207 places a second charged area on the flexible belt 226. The second toner application apparatus 208 places a second dry material, for example toner such that the second charge has been placed. Thus, at least two materials of the layer are formed on the flexible belt 206. Layer 204 moves by the flexible belt adjacent to part and support 202 and is transferred to the part and support 102 as a layer. The base 104, although not shown in FIG. 3 may move the part and support 102 in the Z direction. In order to facilitate the transfer of the at least two materials of the layer 204 to the part and support 102, heating apparatus 210 applies heat to the at least two materials of the layer 204 to change the state of the at least two materials 204 to a sticky state facilitating transfer to the part and support 102. Additionally, heat may be applied to heating roller 212 in order to facilitate the transfer of at least two materials of layer 204. A portion of the layers may remain on the flexible belt. The flexible belt 226 may include residue layer 204 that has not completely transferred to the part and support 102. This excess at least two-materials for the layer 204 may be heated by heating apparatus 214, for example a plate to apply heat to the residue layer 204. A drive roller 216 drives the flexible belt 226. A scanning apparatus 218 scans the flexible belt 226 to determine if there is in fact residue layer 204 left on the flexible belt. If the scanning apparatus 218 determines that there is layer 204 residue on the flexible belt 226, then the residue toner reclaimed apparatus 220 may be energized in order to reclaim the residue at least two dry materials of the layer 204 on flexible belt 226. Thus, the scanning apparatus 218 controls the residue toner reclaimed apparatus 220. The charge eraser apparatus 220 erases the charge from the support belt 226 in order to prepare for another layer 204 to be placed on the part and support 102. A heated roller 224 heats the support belt 226 in order to receive additional at least two material of the layer 204.

Figure 4:
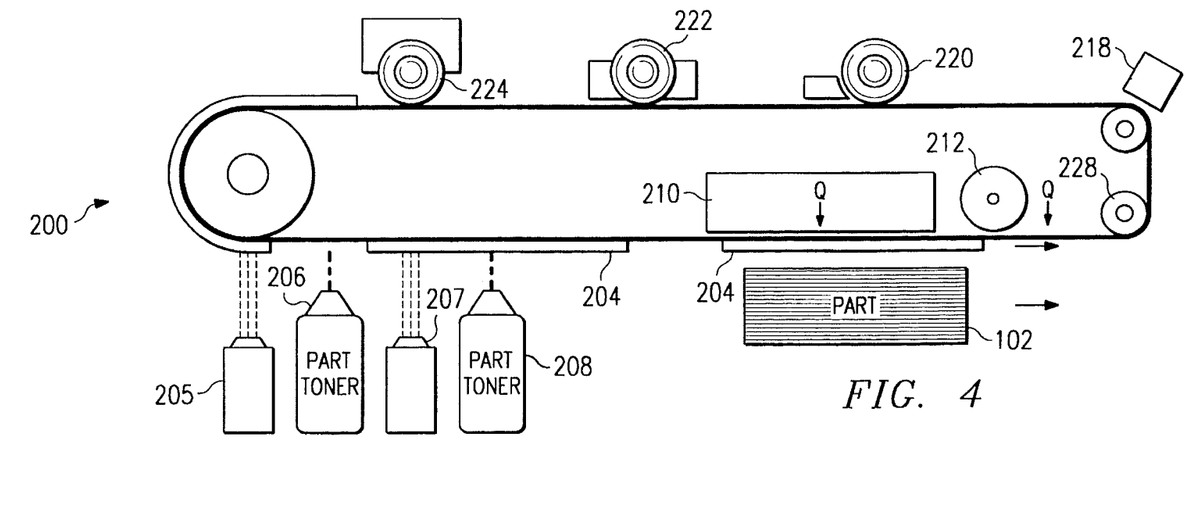
FIG. 4 is a cross section of another embodiment of the present invention.

FIG. 4 illustrates a similar electrostatic imager to FIG. 3 with the exception that the heat apparatus 214 is substituted for a heated roller 212 to apply heat to the support belt 226.

As can be clearly understood, the computer 302 controls the electrostatic imager 101 shown in FIG. 1 or the electrostatic imager 201 in FIG. 3 or the electrostatic imager 200 in FIG. 4. In operation, the first charge application apparatus 205 places a charged area on the flexible belt 226. The toner application apparatus 206 applies a first dry material to the first charge area on the flexible belt 226. This may correspond to the part. The second charge application apparatus 206 applies a second charged area to the flexible belt 226 so that the toner application apparatus 208 may apply a second material dry material to the flexible belt 226. The first and second dry material form the at least two dry materials of the layer 204 which move along the flexible belt towards the heating apparatus 210. The heating apparatus 210 applies heat to the flexible belt 206 so that the at least two materials of the layer 204 is transferred to the part and support 102 forming another layer. The heating roller 202 applies heat to facilitate the transfer of the at least two materials of the layer 204 to the part and support. The residue of layer 201 on the support belt is heated by heating apparatus 214. The residue layer 201 is scanned by scanning apparatus 218 and the residue toner reclaimed apparatus 220 reclaims the residue layer. In order to eliminate any charges on the support belt 216, a charger erasing apparatus 222 is activated to erase any charges on the flexible belt 226. A heater roller 224 facilitates the removal of residue toner.

Figure 7:
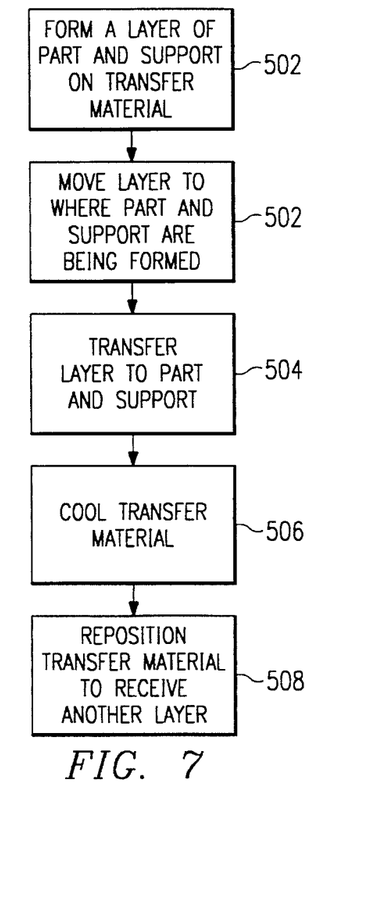
FIG. 7 illustrates a flow chart corresponding to one embodiment of the present invention.

FIG. 7 illustrates a flowchart of the apparatus of FIG. 1. Block 502 forms a layer of part and support on the transfer material. Block 504 moves the layer to where the part and support are being formed. Block 504 transfers the layer to the part and support. Block 506 cools the transfer material, and Block 508 repositions the transfer material to receive another layer.

Figure 8:
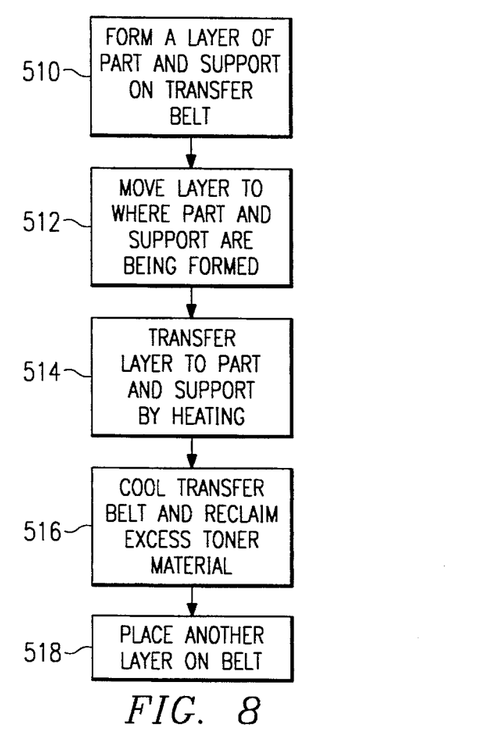
FIG. 8 illustrates a flow chart of another embodiment of the invention.

FIG. 8 illustrates the method of FIG. 3. Block 510 forms a layer of part and support on transfer belt. Block 512 moves the layer to where the part and support are being formed. Block 514 transfers the layer to the part and support by heating. Block 516 cools the transfer belt and reclaims excess toner material. Block 518 places another layer on belt.

Figure 6:
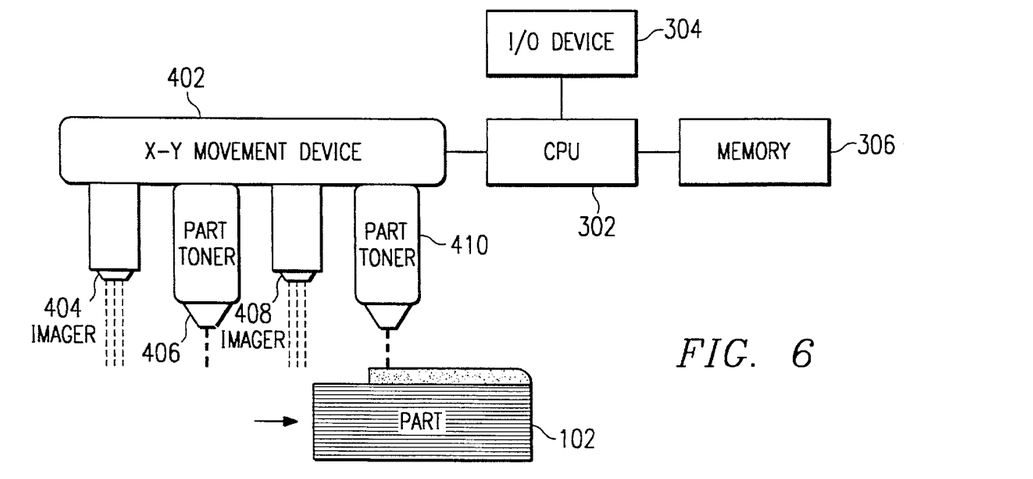
FIG. 6 a cross section of another embodiment of the present invention.

FIG. 6 illustrates another embodiment of the present invention. FIG. 6 illustrates an additional apparatus to build the layers of part and support 102. X-y movement device which can move in the x and y direction in accordance with commands from CPU 302 in accordance with the sectional or sliced data stored in memory 306 forms the part and support 102 through forming at least two charged areas and at least two applications of dry material. In order to form a layer, for example the part, the imager 408 moves across the part and support 102, charging areas of the part and support 102. After the area to be the part has been charged, the part toner apparatus 104 places a first dry material down and it adheres to the areas that have been charged by the apparatus 408. Likewise, the same procedure is used for the imager 404 and the support toner apparatus 406. The area that the support is to be formed on part and support 102 are input from the memory 306 to the CPU 302. The CPU 302 moves the x-y movement device 402 in accordance with the support data and the image apparatus 404 charges the area which corresponds to the new layer of support on part and support 102. Next, the support toner apparatus 406 provides second dry material onto the part and support 102 to form the support portion of the new layer of the part and support 202.

Figure 9:
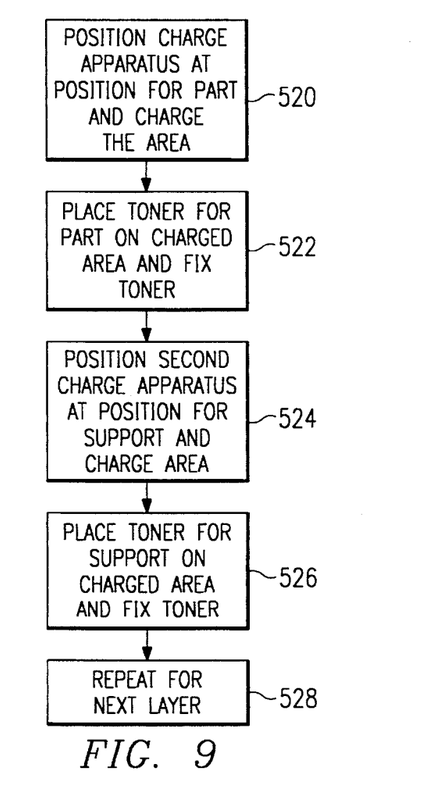
FIG. 9 illustrates a flow chart of another embodiment of the invention.

FIG. 9 illustrates a block diagram of the operation of this aspect of the invention. Block 520 positions the charge apparatus at a position for the part, and the area is charged. Block 522 places the first dry material for the part on the charged area and the first dry material is attracted to the charged area. Block 524 positions a second charger at positions for the support and charges this area. Block 526 places the second dry material for the support on the charged area, and the second dry area is attracted to the charged area for the support. Block 528 repeats this for the next layer.

After the layers have been built, the entire part and support materials are fixed by any number of processes. Although, the above description has been in terms of two materials, namely part and support, the present invention can be applied to using either one material or more than two materials. In order to use more than two materials, it would be clear from the above description that the above mentioned process could be repeated and additional material application and charging apparatus could be applied as necessary.

Figure 11:
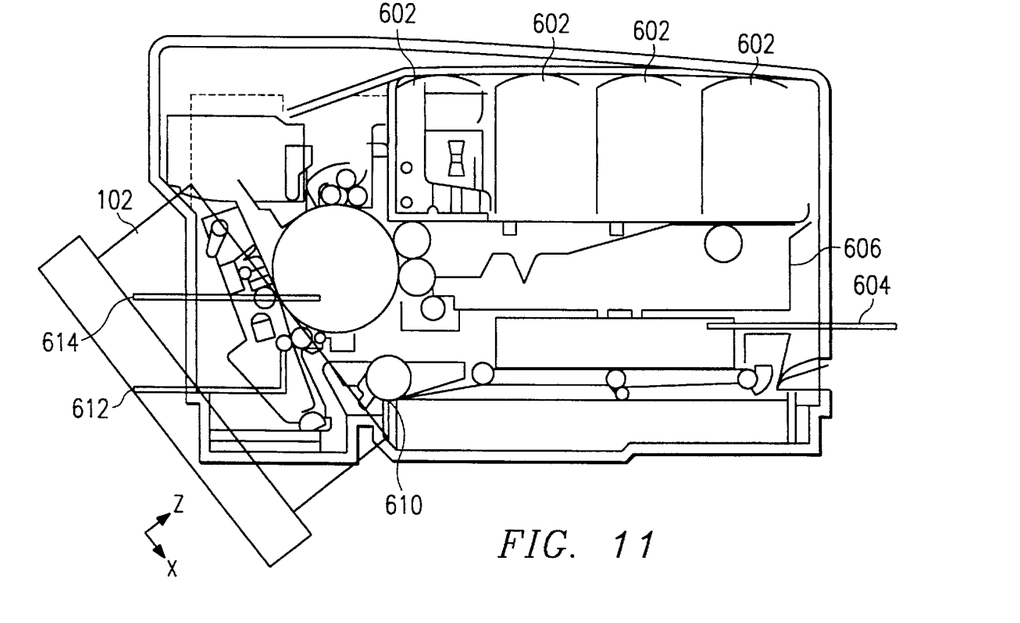
FIG. 11 is a cross section of another embodiment of the present invention.

FIG. 11 illustrates an apparatus that transfers multiple dry materials from drum 614 to part and support 102. The multiple dry materials, for example, a first dry material and a second dry material are transferred sequentially to the drum 614 by the belt 606. First, the optical unit 604 charges an area on belt 606 in accordance with the sliced data. A charging or optical apparatus 604 forms a charged area on belt 606 for a shape of, for example a part. The charged area on the belt is then positioned to adjacent to one of the toner units 602. The toner unit 602 dispenses a first dry material onto the belt 606. The first dry material is subsequently attracted to the charged area to form, for example, either the part or support. The charged area with the dry material is positioned next to the drum 614. The drum 614 is charged sufficiently so that the dry material on the belt 606 is transferred to the drum 614 uniformly without losing the shape of the charged area to be transferred. This process is repeated for each dry material to be transferred. For example, if only two materials are to form a layer of part and support 102, the belt is then positioned adjacent to the charging apparatus 604. The charging apparatus 604 next charges the belt 606 in accordance with the slice data for the support. The second charged area is next positioned next to another toner unit 606 which has a second dry material. The second dry material is dispensed onto the belt 606 and attracted to the second charged area. Next, this second charged area and second dry material are positioned next to drum 614. Again, since the drum 614 is charged sufficiently to attract the second dry material, the second dry material is transferred to the drum 614 along with the first dry material. This sequence continues until the desired number of different areas have been charged and the number of dry materials have been attracted to drum 614. A layer of part and support has been formed now on the drum 614. The drum 614 rotates in order to transfer the first and second dry materials from the drum to the part and support 102 in order to form another layer of the part and support 102. The first and second dry materials are transferred to the part and support 102 by applying heat to the drum 614 sufficient that the first and second dry material reach a tacky state which will cause the first and second dry material to adhere to the part and support 102 forming the new layer.

The part and support should transform from the particle aggregate to a solid. This may be accomplished after a layer is formed or after all the layers have been formed.

If each layer is to be transformed to a solid then a heated roller may be applied to each layer to transform the layer to a solid.

If all the layers are to be transformed to a solid then, all the layers are heated in an oven which may be under pressure.

Other Embodiments

Although the present invention and its advantages have been described in detail, it should be understood that various changes, substitutions and alterations can be made herein without departing from the spirit and scope of the invention as defined by the appended claims.

What is claimed is:

1. A method for fabricating a prototype including a part and support comprising the steps of:

forming a first charged area on a belt;

applying a first material to said belt so that said first material is attracted to said first charged area;

forming a second charged area on said belt;

applying a second material to said belt so that said first material is attracted to said second charged area;

transferring said first material and said second material from said belt to said prototype in order to form said part and support.

2. A method for fabricating a prototype including a part and a support as in claim 1, wherein said step of forming said first charged area comprises the step of forming said first charged area on a flexible belt.

3. A method for fabricating a prototype including a part and a support as in claim 1, wherein said step of forming said first charged area comprises the step of forming said first charged area on a continuous belt.

4. A method for fabricating a prototype including a part and a support as in claim 1, wherein said step of applying said first material comprises the step of applying a first dry material.

5. A method for fabricating a prototype including a part and a support as in claim 1, wherein said step of applying said second material comprises the step of applying a second dry material.

6. A method for fabricating a prototype including a part and a support as in claim 1, wherein said transferring step comprises the step of heating said first and second material sufficiently to transfer said first and second material.

7. A method for fabricating a prototype including a part and support comprising the steps of:

forming a first charged area on a sheet positioned on a belt;

applying a first material to said sheet so that said first material is attracted to said first charged area;

forming a second charged area on said sheet positioned on said belt;

applying a second material to said sheet so that said first material attracted to said second charged area;

transferring said first material and said second material from said belt to said prototype in order to form said part and support.

8. A method for fabricating a prototype including a part and a support as in claim 7, wherein said step of forming said first charged area comprises the step of forming said first charged area on a sheet positioned on a flexible belt.

9. A method for fabricating a prototype including a part and a support as in claim 7, wherein said step of forming said first charged area comprises the step of forming said first charged area or a sheet positioned on a continuous belt.

10. A method for fabricating a prototype including a part and a support as in claim 7, wherein said step of applying said first material comprises the step of applying a first dry material.

11. A method for fabricating a prototype including a part and a support as in claim 7, wherein said step of applying said second material comprises the step of applying a second dry material.

12. A method for fabricating a prototype including a part and a support as in claim 7, wherein said transferring step comprises the step of heating said first and second material sufficiently to transfer said first and second material.

13. An apparatus for fabricating a prototype including a part and support, comprising:
- a belt to transport a layer of said part and support;
- a first charging apparatus to charge a first charged area on said belt;
- a first application apparatus to apply a first material to said belt so that said first material is attracted to said first charged area;
- a second charging apparatus to charge a second area on said belt;
- a second application apparatus to apply a second material to said belt so that said second material is attracted to said second area;
- a transfer apparatus to transfer said first and second material from said belt to said prototype in order to form said part and support.

14. An apparatus for fabricating a prototype including a part and a support as in claim 13, wherein said belt is flexible.

15. An apparatus for fabricating a prototype including a part and a support as in claim 13, wherein said belt is continuous.

16. An apparatus for fabricating a prototype including a part and a support as in claim 13, wherein said first material is a first dry material.

17. An apparatus for fabricating a prototype including a part and a support as in claim 13, wherein said second material is a second dry material.

18. An apparatus for fabricating a prototype including a part and a support as in claim 13, wherein said first charging apparatus and said first charging apparatus are controlled by a single controller.

19. An apparatus for fabricating a prototype including a part and a support as in claim 13, wherein said transfer apparatus transfer said first and second material from said belt by applying heat sufficient so that said first and second materials are tacky.

20. An apparatus for fabricating a prototype including a part and support, comprising:
- a belt to transport a sheet to convey a layer of said part and support;
- a first charging apparatus to charge a first charged area positioned on said sheet;
- a first application apparatus to apply a first material to said sheet so that said first material is attracted to said first charged area;
- a second charging apparatus to charge a second area positioned on said sheet;
- a second application apparatus to apply a second material to said sheet so that said second material is attracted to said second area;
- a transfer apparatus to transfer said first and second material from said belt to said prototype in order to form said part and support.

21. An apparatus for fabricating a prototype including a part and a support as in claim 20, wherein said belt is flexible.

22. An apparatus for fabricating a prototype including a part and a support as in claim 20, wherein said belt is continuous.

23. An apparatus for fabricating a prototype including a part and a support as in claim 20, wherein said first material is a first dry material.

24. An apparatus for fabricating a prototype including a part and a support as in claim 20, wherein said second material is a second dry material.

25. An apparatus for fabricating a prototype including a part and a support as in claim 20, wherein said first charging apparatus and said first charging apparatus are controlled by a single controller.

26. An apparatus for fabricating a prototype including a part and a support as in claim 20, wherein said transfer apparatus transfer said first and second material from said belt by applying heat sufficient so that said first and second materials are tacky.

* * * * *